(12) United States Patent
Wang et al.

(10) Patent No.: US 10,562,772 B2
(45) Date of Patent: Feb. 18, 2020

(54) DEVICE FOR MAKING CARBON NANOTUBE STRUCTURE

(71) Applicants: Tsinghua University, Beijing (CN); HON HAI PRECISION INDUSTRY CO., LTD., New Taipei (TW)

(72) Inventors: Jiang-Tao Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 329 days.

(21) Appl. No.: 15/498,476

(22) Filed: Apr. 27, 2017

(65) Prior Publication Data

US 2017/0313587 A1 Nov. 2, 2017

(30) Foreign Application Priority Data

Apr. 28, 2016 (CN) .......................... 2016 1 0275067

(51) Int. Cl.
*C01B 32/16* (2017.01)
*B82Y 30/00* (2011.01)
*B82Y 40/00* (2011.01)

(52) U.S. Cl.
CPC ............... *C01B 32/16* (2017.08); *B82Y 30/00* (2013.01); *B82Y 40/00* (2013.01); *Y10S 977/742* (2013.01); *Y10S 977/842* (2013.01)

(58) Field of Classification Search
CPC .. C01B 32/16; Y10S 977/842; Y10S 977/742; B82Y 30/00; B82Y 40/00
See application file for complete search history.

(56) References Cited

U.S. PATENT DOCUMENTS

2017/0313588 A1* 11/2017 Wang ..................... C01B 32/168
2017/0313589 A1* 11/2017 Wang ..................... C01B 32/168

* cited by examiner

*Primary Examiner* — Robert J Grun
(74) *Attorney, Agent, or Firm* — ScienBiziP, P.C.

(57) ABSTRACT

The disclosure relates to a device for making carbon nanotube structure. The device includes: an elastic rod including a first end and a second end opposite to the first end; and a controller connected to the first end and the second end respectively, wherein the controller is configured to rotate the elastic rod around a rotational axis which coincides with a center axis of the elastic rod.

15 Claims, 6 Drawing Sheets

DEVICE FOR MAKING CARBON NANOTUBE STRUCTURE

CROSS-REFERENCE TO RELATED APPLICATIONS

This application claims all benefits accruing under 35 U.S.C. § 119 from China Patent Application No. 201610275067.5, filed on Apr. 28, 2016, in the China Intellectual Property Office. This application is related to commonly-assigned application entitled, "METHOD FOR MAKING CARBON NANOTUBE STRUCTURE", concurrently filed Ser. No. 15/498,501; "METHOD FOR MAKING CARBON NANOTUBE STRUCTURE", concurrently filed Ser. No. 15/498,478. Disclosures of the above-identified applications are incorporated herein by reference.

BACKGROUND

1. Technical Field

The subject matter herein generally relates to a device for making carbon nanotube structure and especially relates to a device for making carbon nanotube structure drawn from carbon nanotube arrays.

2. Description of Related Art

Carbon nanotubes (CNTs) are electrically conductive along their length, chemically stable, and each can have a very small diameter (much less than 100 nanometers) and large aspect ratios (length/diameter). Due to these and other properties, it has been suggested that CNTs can play an important role in many fields, such as microscopic electronics, field emission devices, thermal interface materials, etc.

The carbon nanotube structure could be a carbon nanotube film or a carbon nanotube wire. However, in prior art the width of the carbon nanotube structure drawn from carbon nanotube array is unchangeable and is approximately equal to the contact width of the carbon nanotube structure and carbon nanotube array, and the contact width is limited by the size of the carbon nanotube array.

What is needed, therefore, is to provide a device for making carbon nanotube structure which can overcome the shortcomings as described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to be better illustrate details and features. The description is not to considered as limiting the scope of the embodiments described herein.

Several definitions that apply throughout this disclosure will now be presented.

The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
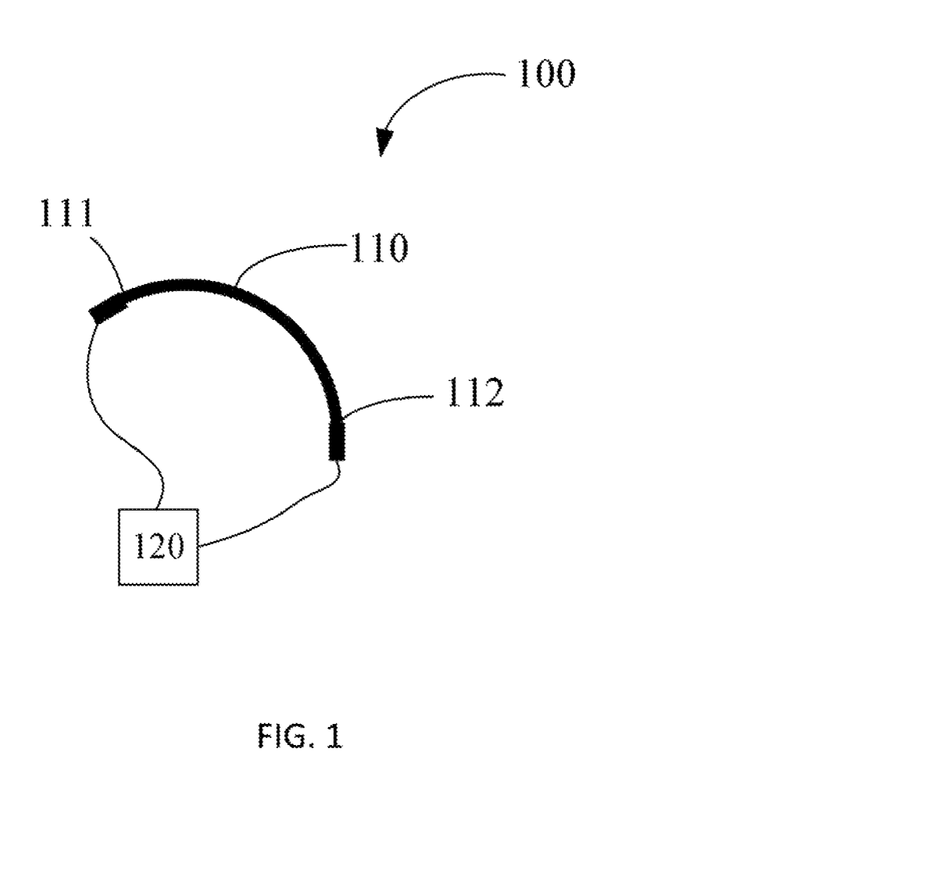
FIG. 1 is a schematic view of one embodiment of a device for making carbon nanotube structure.

Referring to FIG. 1, a device 100 for making carbon nanotube structure of one embodiment is provided. The device 100 is used to draw carbon nanotube structure from a carbon nanotube array. The carbon nanotube structure could be a carbon nanotube film or a carbon nanotube wire. The device 100 includes an elastic rod 110 and a controller 120. The elastic rod 110 includes a first end 111 and a second end 112 opposite to the first end 111. The first end 111 and the second end 112 are connected to the controller 120 respectively. The main part of the elastic rod 110 is suspended when the device 100 is applied to make carbon nanotube structure.

Figure 3:
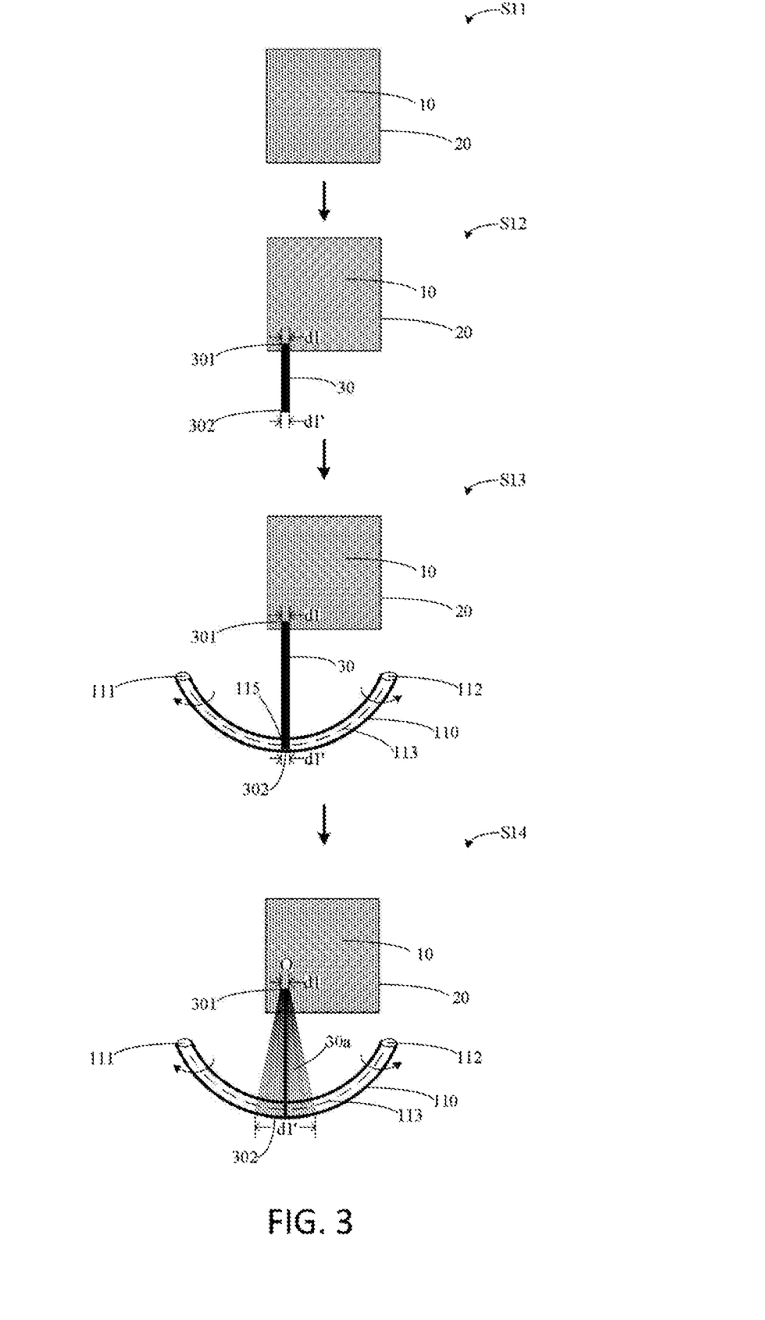
FIG. 3 is a schematic view of one embodiment of a method for a making carbon nanotube film.

The controller 120 is configured to rotate the elastic rod 110 around a rotational axis 113 as shown in FIG. 3. The rotational axis 113 passes through the center axis of the elastic rod 110, in other word, the rotational axis 113 coincides with the center axis which extended along the length direction of the elastic rod 110. The controller 120 is also configured to control the shape of the elastic rod 110 by adjusting the distance between the first end 111 and the second end 112.

Figure 2:
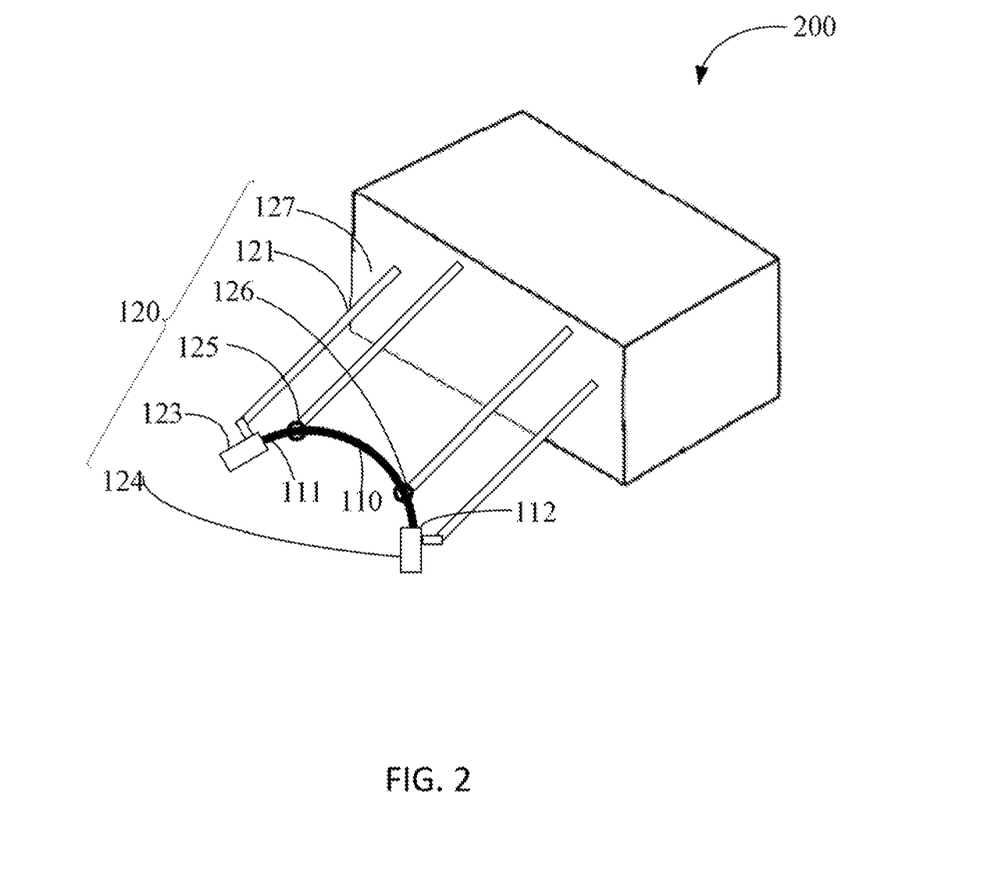
FIG. 2 is a schematic view of another embodiment of a device for making carbon nanotube structure.

Referring to FIG. 2, in one embodiment, the controller 120 includes a first driving element 123, a second driving element 124, a first limit element 125, a second limit element 126, a controller body 127 and connecting rods 121. The first driving element 123, the second driving element 124, the first limit element 125, and the second limit element 126 are connected to the controller body 127 via the connecting rods 121 respectively. The controller body 127 is configured to control the position of the first driving element 123, the second driving element 124, the first limit element 125, and the second limit element 126. The shape, especially the degree and the direction of bending, of the elastic rod 110 is controlled by the positions of the first driving element 123, the second driving element 124, the first limit element 125, and the second limit element 126.

The first driving element 123 is connected to the first end 111. The second driving element 124 is connected to the second end 112. The rotation speed of the elastic rod 110 is controlled by the rotation speed of the first driving element 123 and the second driving element 124. The rotation direction of the elastic rod 110 is controlled by the rotation direction of the first driving element 123 and the second driving element 124. The first driving element 123 and the second driving element 124 have the same rotation speed and the same rotation direction. In one embodiment, the rotation speed of the first driving element 123 and the second driving element 124 could be several tens to several hundred revolutions per minute. In one embodiment, both of the first driving element 123 and the second driving element 124 are the motor.

The number of the driving element is not limited. In one embodiment, the elastic rod 110 is driven by only one driving element. The first end 111 is connected to and driven by the driving element, and the second end 112 is rotated following the first end 111.

The first limit element 125 and the second limit element 126 are configured to adjust the shape of the elastic rod 110. The first limit element 125 and the second limit element 126 are rotatably connected to the elastic rod 110. The first limit element 125 is located near the first end 111, and the second limit element 126 is located near the second end 112. In one embodiment, the first limit element 125 and the second limit element 126 are symmetrically located at two opposite sides of the elastic rod 110.

In one embodiment, the first limit element 125 and the second limit element 126 are circular rings. The inner diameter of the first limit element 125 is equal to the inner diameter of the second limit element 126. The inner diameter D1 of the first limit element 125 and the second limit element 126 is equal to or slightly larger than the diameter D2 of the elastic rod 110. In one embodiment, 0.5 millimeter<D1-D2<5 millimeter.

In one embodiment, the distance between the first limit element 125 and the first end 111 is L1, and the distance between the second limit element 126 and the second end 112 is L2, 10 millimeter<L1=L2<50 millimeter.

The first limit element 125 or the second limit element 126 is optional, and the number and the location of the limit element can be changed according to the actual situation.

The elastic rod 110 has good elasticity. The shape of the elastic rod 110 can be changed by a first external force, for example, from a straight rod to a curved rod, and the shape of the curved rod could be an arc, elliptical arc, or irregular arcs. The curvature of the curved rod can vary by the first external force. Furthermore, the elastic rod 110 can rotate around a rotational axis 113 which coincides with the center axis of the elastic rod 110 by a second external force.

The elastic rod 110 comprises a material selected from the group consisting of plastic, resin, rubber or the like. The flexural modulus of the elastic rod 110 can range from about 1 MPa to about 20 MPa. In one embodiment, the material of the elastic rod 110 is silicone rubber, and the flexural modulus is 5 MPa.

The elastic rod 110 comprises a material having good elasticity, such as plastic, resin, rubber or the like. The rotational axis 113 can be a virtual axis, or a real axis comprising a grid materials such as metal. In one embodiment, the rotational axis 113 is a steel wire.

The cross-sectional shape of the elastic rod 110 is not limited. In one embodiment, the cross-sectional shape of the elastic rod 110 is round, and the diameter of the elastic rod 110 can range from about 1 millimeter to about 50 millimeters.

When the device 100 works, the first end 111 is rotated by the first driving element 123 and the second end 112 is rotated by the second driving element 124. The rotation speed of the first driving element 123 is equal to the rotation speed of the second driving element 124. Then the elastic rod 110 is rotated around a rotational axis 113 which passes through the center axis of the elastic rod 110. The rotation speed of the elastic rod 110 is not limited. In one embodiment, the linear velocity of the elastic rod 110 can range from about 0.01 centimeters per second to about 100 centimeters per second.

Referring to FIG. 3, a method for making a carbon nanotube film 30a of one embodiment includes the following steps:

step (S11), providing a carbon nanotube array 10 formed on a surface of a substrate 20, wherein the carbon nanotube array 10 comprises a plurality of carbon nanotubes substantially perpendicular to the surface of the substrate 20;

step (S12), drawing a first carbon nanotube film 30 from the carbon nanotube array 10, wherein the first carbon nanotube film 30 comprises a first end 301 connected to the carbon nanotube array 10 and a second end 302 opposite to the first end 301;

step (S13), providing an elastic rod 110 which substantially parallel to the surface of the substrate 20, and fixing the second end 302 of the first carbon nanotube film 30 to a first portion 115 of the elastic rod 110; and step (S14), rotating the elastic rod 110 around a rotational axis 113 which coincides with the center axis of the elastic rod 110, wherein the elastic rod 110 is kept to be curved toward the carbon nanotube array 10 during the rotating of the elastic rod 110.

In step (S11), the carbon nanotube array 10 includes a plurality of carbon nanotubes substantially perpendicular to the surface of the substrate 20. The carbon nanotube array 10 is grown on the substrate 20 by a chemical vapor deposition (CVD) method. The carbon nanotube array 10 comprises a plurality of carbon nanotubes oriented substantially perpendicular to a growing surface of the substrate 20. The carbon nanotubes in the carbon nanotube array 10 are closely bonded together side-by-side by van der Waals attractive forces. By controlling growing conditions, the carbon nanotube array 10 can be essentially free of impurities such as carbonaceous or residual catalyst particles. Accordingly, the carbon nanotubes in the carbon nanotube array 10 are closely contacting each other, and a relatively large van der Waals attractive force exists between adjacent carbon nanotubes. The van der Waals attractive force is so large that when drawing a carbon nanotube segment (e.g., a few carbon nanotubes arranged side-by-side), adjacent carbon nanotube segments can be drawn out end-to-end from the carbon nanotube array 10 due to the van der Waals attractive forces between the carbon nanotubes. The carbon nanotubes are continuously drawn to form a free-standing and macroscopic carbon nanotube structure, which can be in the shape of a film or a wire. The carbon nanotube array 10, that can have the first carbon nanotube film 30 drawn therefrom, can be a super-aligned carbon nanotube array. A material of the substrate 20 can be P-type silicon, N-type silicon, or other materials that are suitable for growing the super-aligned carbon nanotube array.

Step (S12) further includes the substeps of:

step (S121), selecting a carbon nanotube segment having a predetermined width; and step (S122), pulling the carbon nanotube segment to form the first carbon nanotube film 30.

In step (S121), the carbon nanotube segments having a predetermined width can be selected by using a wide adhesive tape as the tool to contact the carbon nanotube array 10.

In step (S122), the pulling direction is, usefully, substantially perpendicular to the growing direction of the carbon nanotube array 10. During the pulling process, as the initial carbon nanotube segments are drawn out, other carbon nanotube segments are also drawn out end to end, due to the van der Waals attractive force between ends of adjacent segments. The first carbon nanotube film 30 produced in such manner can be selectively formed having a predetermined width. The first carbon nanotube film 30 includes a plurality of carbon nanotube segments. The carbon nanotubes in the first carbon nanotube film 30 are mainly parallel to the pulling direction of the first carbon nanotube film 30.

In step (S12), the first carbon nanotube film 30 has two ends, a first end 301 and a second end 302 opposite to the first end 301. The second end 302 is fixed to the first portion 115 of the elastic rod 110. In one embodiment, the first portion 115 is the middle portion of the elastic rod 110. The width of the first end 301 is the contact width of the first carbon nanotube film 30 and carbon nanotube array 10 and defined as d1. The width of the second end 302 is the contact width of the first carbon nanotube film 30 and the elastic rod 110 and defined as d1'. The width d1 is substantially equal to the width d1' in step (S12).

In step (S13), the shape of the elastic rod 110 is not limited. That is the elastic rod 110 could be a straight rod or a curved rod. In one embodiment, the second end 302 of the first carbon nanotube film 30 is directly fixed to a curved rod. In one embodiment, the second end 302 of the first carbon nanotube film 30 is firstly fixed to a straight rod, and then the shape of the straight rod is changed to be curved toward the carbon nanotube array 10.

In step (S14), the elastic rod 110 is rotated around a rotational axis 113 by a second external force. The rotational axis 113 coincides with the center axis of the elastic rod 110, in other word, the rotational axis 113 passes through the center axis of the elastic rod 110. The second external force could be provided by the controller 120 or by the operator's hand. During the rotation process, the elastic rod 110 is kept to be curved toward the carbon nanotube array 10.

The elastic rod 110 is rotated at a uniform speed which can be ranged from about 0.01 centimeters per second to about 100 centimeters per second. Before the rotation process, the first end 301 and the second end 302 have a same width. During the rotation process, the width d1 of the first end 301 substantially remains unchanged, while the width d' of the second end 302 is gradually increased.

Figure 4:
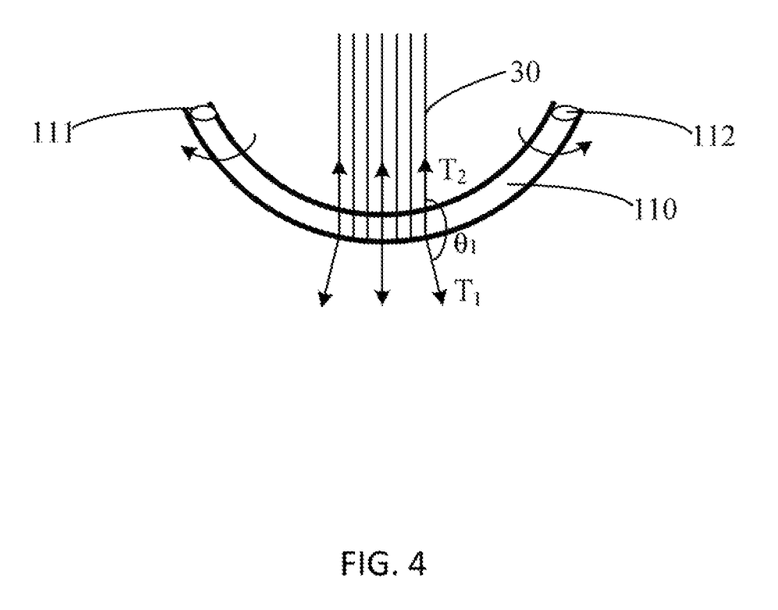
FIG. 4 is a force analytical view of a method for a making carbon nanotube film.

Referring to FIG. 4, the first carbon nanotube film 30 includes a plurality of carbon nanotube yarns formed by carbon nanotubes connected end to end. During the rotation process, the carbon nanotube yarns are subjected to a first force T1 and a second force T2 simultaneously. The first force T1 is applied by the elastic rod 110 and the second force T2 is applied to the carbon nanotube array 10. The angle between the first force T1 and the second force T2 is $\theta_1$, and $90°<\theta_1 \leq 180°$. In one embodiment, the angle $\theta_1$ between the first force T1 and the second force T2 ranges from about 120° to about 180°. The width d1' of the second end 302 is gradually increased by the first force T1 and the second force T2. The width d1' of the second end 302 can be adjusted by varying the curvature of the elastic rod 110.

The d1' has a maximal value when the angle $\theta$ between the first force T1 and the second force T2 increased to 180°. In this condition, the shape of the elastic rod 110 is a circular arc, and the arc core O is located at the contact portion of the first carbon nanotube film 30 and the carbon nanotube array 10. The maximal value of d1' is decided by the radius of the elastic rod 110.

Figure 5:
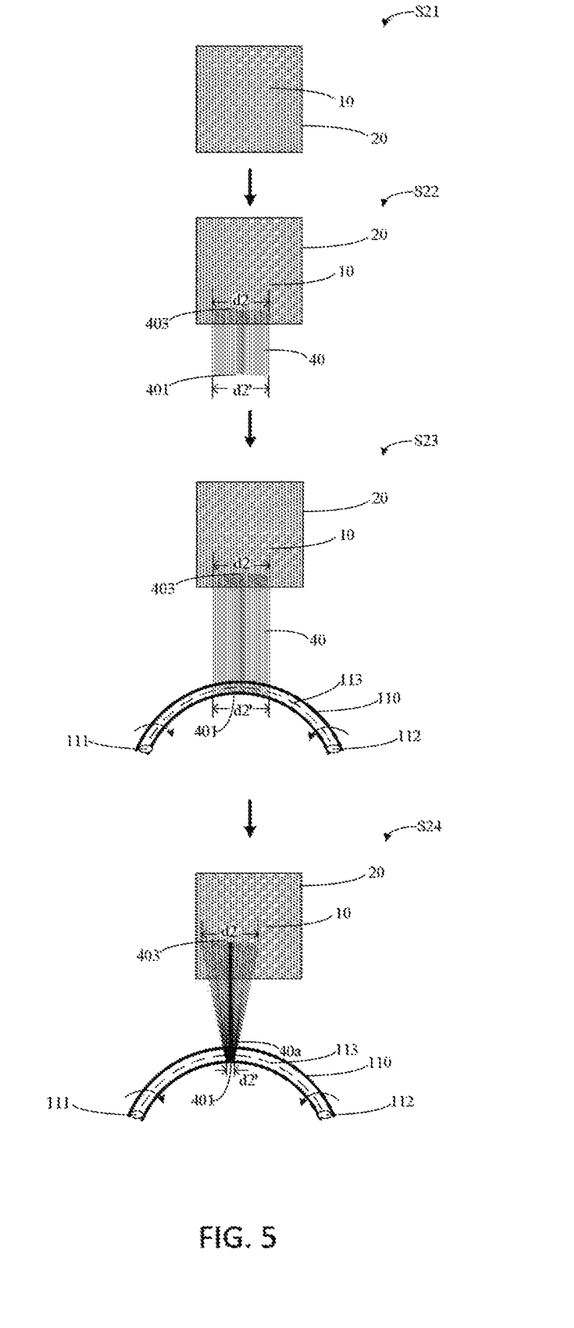
FIG. 5 is a schematic view of one embodiment of a method for a making carbon nanotube wire.

Referring to FIG. 5, a method for making a carbon nanotube wire 40a of one embodiment includes the following steps:

step (S21), providing a carbon nanotube array 10 formed on a surface of a substrate 20, the carbon nanotube array 10 includes a plurality of carbon nanotubes substantially perpendicular to the surface of the substrate 20;

step (S22), drawing a first carbon nanotube film 40 from the carbon nanotube array 10, wherein the first carbon nanotube film 40 comprises a first end 401 connected to the carbon nanotube array 10 and a second end 402 opposite to the first end 401;

step (S23), providing an elastic rod 110 which substantially parallel to the surface of the substrate 20 and fixing second end 402 of the first carbon nanotube film 40 to a first portion 115 of the elastic rod 110; and step (S24), rotating the elastic rod 110 around a rotational axis 113 which coincides with the center axis of the elastic rod 110, wherein the elastic rod 110 is kept to be curved away from the carbon nanotube array 10 during the rotating of the elastic rod 110.

The method for making a carbon nanotube wire 40a in the embodiment shown in FIG. 5 is similar to the method for making a carbon nanotube film 30a in the embodiment shown in FIG. 3, except that in step (S24) the elastic rod 110 is kept to be curved away from the carbon nanotube array during rotating the elastic rod.

Before the rotation process, the first end 401 and the second end 402 have a same width. During the rotation process, the width d2 of the first end 401 substantially remains unchanged, while the width d2' of the second end 402 is gradually decreased.

Figure 6:
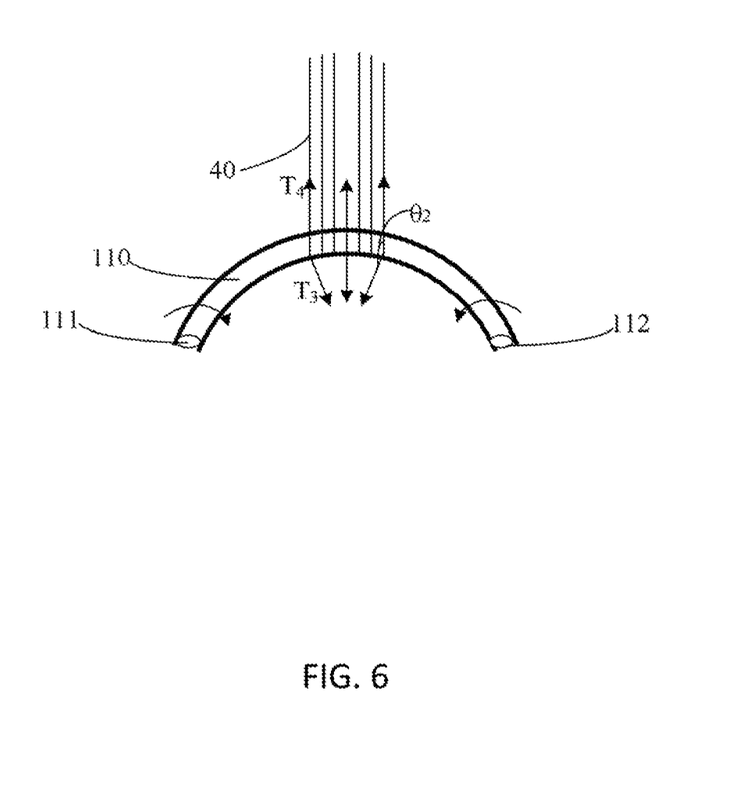
FIG. 6 is a force analytical view of a method for a making carbon nanotube wire.

During the rotation process, the first carbon nanotube film 40 is subjected to a third force T3 and a fourth force T4, simultaneously shown in FIG. 6. The third force T3 is applied by the elastic rod 110, and the fourth force T4 is applied to the carbon nanotube array 10. The angle between the third force T3 and the fourth force T4 is $\theta_2$, and $90°<\theta_2 \leq 180°$. In one embodiment, the angle $\theta_2$ between the third force T3 and the fourth force T4 ranges from about 120° to about 180°. The width d2' of the second end 402 is gradually decreased by the third force T3 and the fourth force T4, and the d2' has a minimum value when the angle between the third force T3 and the fourth force T4 increased to 180°.

A method for making a carbon nanotube structure of one embodiment includes the following steps:

step (S31), providing a carbon nanotube array formed on a surface of a substrate, wherein the carbon nanotube array comprises a plurality of carbon nanotubes substantially perpendicular to the surface of the substrate;

step (S32), drawing a first carbon nanotube film from the carbon nanotube array, wherein the first carbon nanotube film comprises a first end connected to the carbon nanotube array and a second end opposite to the first end;

step (S33), providing a straight elastic rod, fixing the second end of the first carbon nanotube film to a first portion of the straight elastic rod, and curving the straight elastic rod to be a curved elastic rod; and step (S34), rotating the curved elastic rod around a rotational axis which coincides with a center axis of the curved elastic rod, wherein the curved elastic rod is curved during the rotating of the curved elastic rod.

The curved elastic rod defined a planar surface, the planar surface and the surface of the substrate is not perpendicular with each other. The angle between the planar surface and the surface of the substrate is in less than 30 degrees. In one embodiment, the angle between the planar surface and the surface of the substrate is about 0 degrees.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A device for making carbon nanotube structure, comprising:
    an elastic rod comprising a first end and a second end opposite to the first end; and
    a controller connected to the first end and the second end, wherein the controller is configured to rotate the elastic rod around a rotational axis which coincides with a center axis of the elastic rod; wherein the controller comprises a first driving element connected to the first end and a second driving element connected to the second end; the first end is rotated by the first driving element, and the second end is rotated by the second driving element; and
    when the device is operated, the elastic rod is kept curved and rotated around the rotational axis to draw a carbon nanotube structure from a carbon nanotube array.

2. The device as claimed in claim 1, wherein the controller is configured to control a shape of the elastic rod by adjusting positions of the first driving element and the second driving element.

3. The device as claimed in claim 2, wherein the controller is configured to adjust a distance between the first end and the second end.

4. The device as claimed in claim 1, wherein the controller comprises:
    at least one limit element configured to adjust a shape of the elastic rod, the at least one limit element is rotatably connected to the elastic rod, a position of the at least one limit element is adjusted by the controller.

5. The device as claimed in claim 4, wherein the at least one limit element is circular rings.

6. The device as claimed in claim 5, wherein an inner diameter D1 of the at least one limit element is equal to or greater than a diameter D2 of the elastic rod.

7. The device as claimed in claim 6, wherein 0.5 millimeters<D1−D2<5 millimeters.

8. The device as claimed in claim 4, wherein the controller further comprises: a first limit element located near the first end; and a second limit element located near the second end.

9. The device as claimed in claim 8, wherein a first length between the first limit element and the first end is L1, and a second length between the second limit element and the second end is L2, and 10 millimeters<L1=L2<50 millimeters.

10. The device as claimed in claim 1, wherein a flexural modulus of the elastic rod ranges from about 1 MPa to about 20 MPa.

11. The device as claimed in claim 10, wherein the elastic rod comprises a material selected from the group consisting of plastic, resin, and rubber.

12. The device as claimed in claim 11, wherein a cross-sectional shape of the elastic rod is round.

13. The device as claimed in claim 12, wherein a diameter of the elastic rod ranges from about 1 millimeter to about 50 millimeters.

14. A device for making carbon nanotube structure, comprising:
    an elastic rod comprising a first end and a second end opposite to the first end;
    a first driving element connected to the first end and configured to rotate the first end;
    a second driving element connected to the second end and configured to rotate the second end; and
    a controller body configured to adjust a distance between the first end and the second end; wherein the first driving element is connected to the controller body via a first connecting rod, and the second driving element is connected to the controller body via a second connecting rod; and
    when the device is operated, the elastic rod is kept curved and rotated around the rotational axis to draw a carbon nanotube structure from a carbon nanotube array.

15. A device for making carbon nanotube structure, comprising:
    an elastic rod comprising a first end and a second end opposite to the first end;
    a first driving element connected to the first end and configured to rotate the first end so that the second end is rotated following the first end; and
    a controller body configured to adjust the distance between the first end and the second end; wherein the first driving element is connected to the controller body via a first connecting rod, and the second driving element is connected to the controller body via a second connecting rod; and
    when the device is operated, the elastic rod is kept curved and rotated around the rotational axis to draw a carbon nanotube structure from a carbon nanotube array.

* * * * *